(12) United States Patent
Smith et al.

(10) Patent No.: US 10,001,365 B2
(45) Date of Patent: Jun. 19, 2018

(54) METHODS AND SYSTEMS FOR FORMING A MANDREL ASSEMBLY FOR USE WITH A LOCATING SYSTEM

(71) Applicant: The Boeing Company, Huntington Beach, CA (US)

(72) Inventors: Brian D. Smith, Charleston, SC (US); Kyle Michael Ithal, Summerville, SC (US); Byron James Autry, Charleston, SC (US); David H. Curry, III, Charleston, SC (US)

(73) Assignee: The Boeing Company, Chicago, IL (US)

( * ) Notice: Subject to any disclaimer, the term of this patent is extended or adjusted under 35 U.S.C. 154(b) by 808 days.

(21) Appl. No.: 14/477,277

(22) Filed: Sep. 4, 2014

(65) Prior Publication Data

US 2016/0069746 A1    Mar. 10, 2016

(51) Int. Cl.
| | | |
|---|---|---|
| *G01B 11/00* | (2006.01) | |
| *G01B 11/03* | (2006.01) | |
| *G01S 17/42* | (2006.01) | |
| *G01S 17/88* | (2006.01) | |

(52) U.S. Cl.
CPC .............. *G01B 11/03* (2013.01); *G01S 17/42* (2013.01); *G01S 17/88* (2013.01)

(58) Field of Classification Search
CPC ....... G01B 11/03; G01B 21/042; G01S 17/42; G06K 9/00
See application file for complete search history.

(56) References Cited

U.S. PATENT DOCUMENTS

| | | | |
|---|---|---|---|
| 7,454,265 B2 | 11/2008 | Marsh | |
| 7,587,258 B2 | 9/2009 | Marsh et al. | |
| 7,661,199 B2 | 2/2010 | Marsh et al. | |
| 7,743,660 B2 | 6/2010 | Marsh et al. | |
| 7,783,376 B2 | 8/2010 | Marsh et al. | |
| 9,215,453 B2 * | 12/2015 | Macchia | G01B 11/245 |
| 2006/0152711 A1 * | 7/2006 | Dale, Jr. | G01B 11/2755 356/139.09 |
| 2014/0022380 A1 | 1/2014 | Nissen et al. | |

* cited by examiner

*Primary Examiner* — Tri Ton
*Assistant Examiner* — Rebecca C Bryant
(74) *Attorney, Agent, or Firm* — Armstrong Teasdale LLP

(57) ABSTRACT

A method of forming a mandrel assembly for use in fabricating a large scale component includes boring a plurality of cavities into an outer surface of the mandrel assembly and filling the plurality of cavities with a contrast color substrate to form a contrast target on the mandrel assembly. The method also includes curing the contrast color substrate such that an outer surface of the contrast color substrate is substantially flush with the outer surface of the mandrel assembly when the substrate is fully cured.

20 Claims, 4 Drawing Sheets

METHODS AND SYSTEMS FOR FORMING A MANDREL ASSEMBLY FOR USE WITH A LOCATING SYSTEM

BACKGROUND

The present invention generally relates to the use of optical systems, such as laser projection, to locate certain component features, and, more specifically, relates to forming contrast targets in the component that are located by the optical system to make precise measurements of the component and/or project images onto the component.

Various processes are utilized to locate features on one or more surfaces of a component. For example, laser projection processes are sometimes used to locate features of a component and project patterns onto the component surface. The laser projection process uses a photomultiplier or photodiode, galvanometers, and software to calculate, store, and display the 3-dimensional position of a target which is positioned on or near the surface being measured. At least some known laser projection systems measure a component by placing the targets on opposing ends of the component and positioning the laser projector a distance from the component such that the projector's field of view includes the targets at both ends of the component. Such a setup results in measurements of acceptable accuracy.

However, when measuring a larger component, the laser projector must be positioned a greater distance from the component to ensure that the field of view contains the targets at both ends of the component. The greater distance between the component and the laser projector results in measurements that do not meet predetermined accuracy requirements. Accordingly, there is a need for a surface locating system that alleviates one or more of these problems, and allows relatively rapid, accurate location and measurement of relatively large component surfaces and features.

BRIEF DESCRIPTION

In one aspect, a method of forming a mandrel assembly for use in fabricating a large scale component is provided. The method includes boring a plurality of cavities into an outer surface of the mandrel assembly and filling the plurality of cavities with a contrast color substrate to form a contrast target on the mandrel assembly. The method also includes curing the contrast color substrate such that an outer surface of the contrast color substrate is substantially flush with the outer surface of the mandrel assembly when the substrate is fully cured.

In another aspect, a method of measuring a feature of a component is provided. The method includes coupling a first plurality of end targets to a first end of the component and coupling a second plurality of end targets to a second end of the component. The method also includes forming a plurality of center color contrast targets in a surface of the component between the first and second ends. A first projector is positioned a predetermined distance from the component. The first projector has a defined first field of view that includes at least one of the first plurality of end targets and at least one of the plurality of center color contrast targets. A second projector is positioned a predetermined distance from the component. The second projector has a defined second field of view that includes at least one of the second plurality of targets and at least one of the plurality of center color contrast targets.

In yet another aspect, a system for measuring a feature of a component is provided. The system includes a plurality of laser projectors each having a defined respective field of view that at least partially overlaps a field of view of an adjacent laser projector such that the overlapping portions define a common field of view. The system also includes a plurality of end targets coupled to opposing ends of the component and at least one plurality of center color contrast targets formed in a surface of the component between the opposing ends. Each common field of view includes a plurality of center color contrast targets.

DETAILED DESCRIPTION

Figure 1:
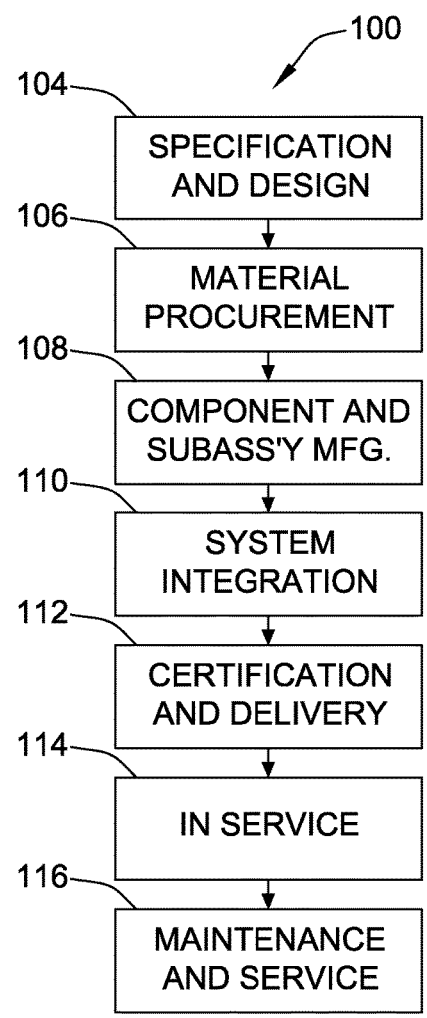
FIG. 1 is a flow diagram of an exemplary aircraft production and service methodology.
Figure 2:
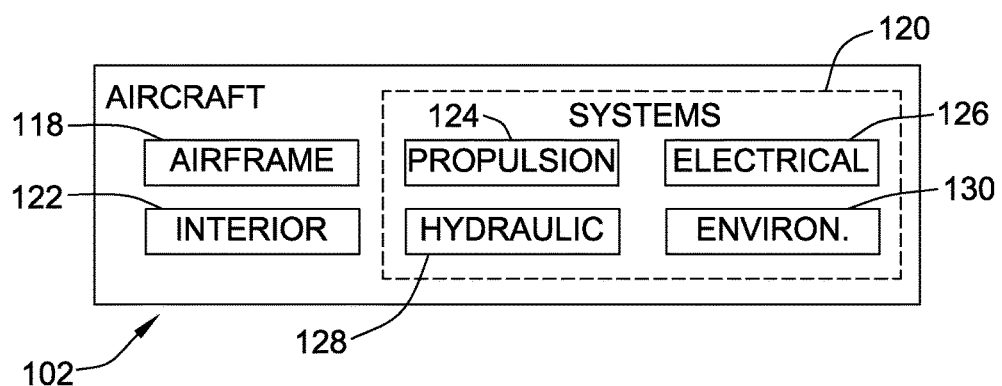
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
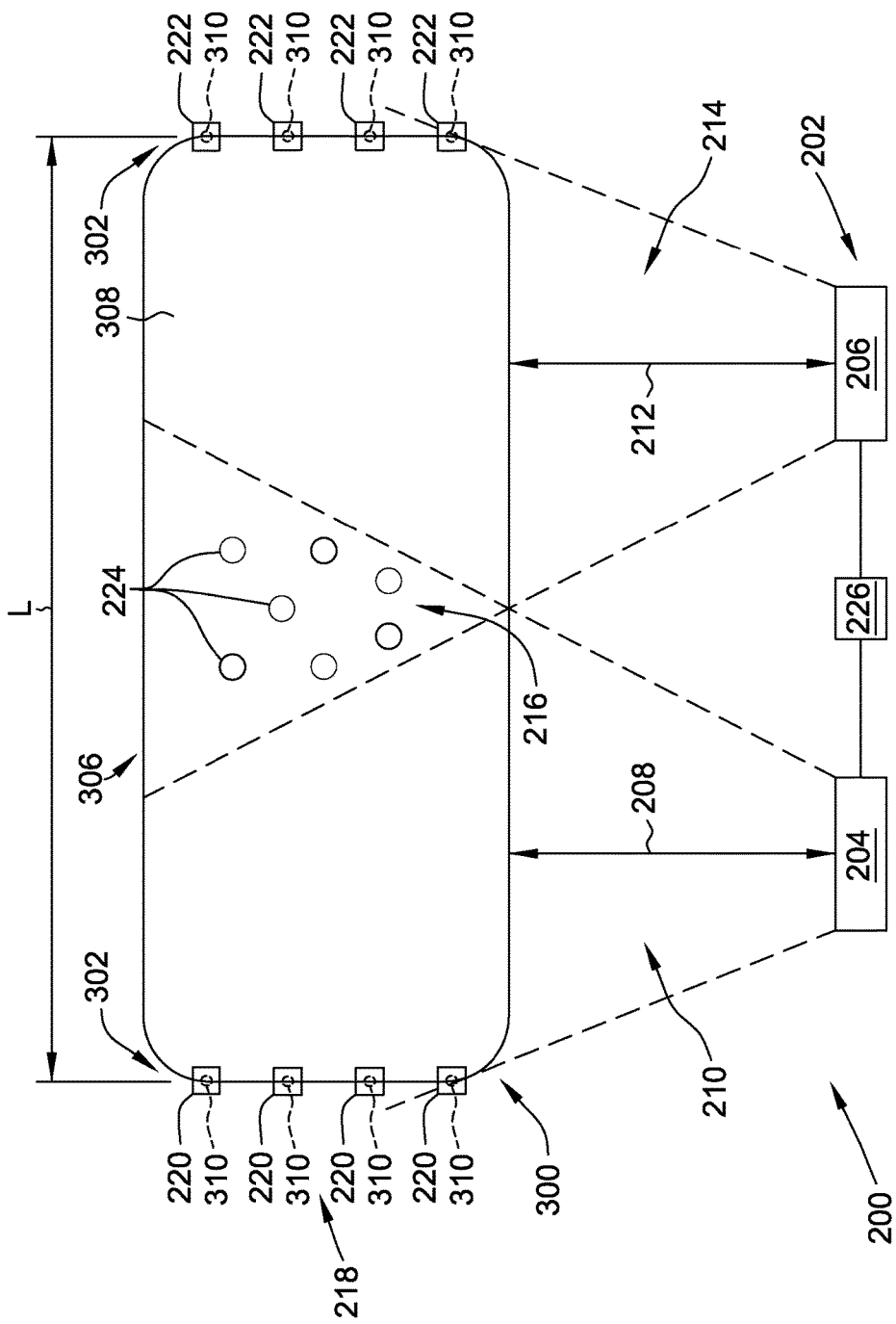
FIG. 3 is a top view of an exemplary locating system for locating and measuring features of a component and projecting patterns onto that component.

FIG. 3 is a top view of an exemplary locating system 200 for locating and measuring features of a large-scale component 300 and projecting patterns onto component 300. Given by way of non-limiting example for illustration purposes only and not by way of limitation, component 300 may be an assembly tool for use in assembling an aircraft part, such as without limitation a section of airframe 118 (shown in FIG. 1), such as an aircraft fuselage. More specifically, component 300 is a large-scale mandrel assembly configured to be covered in a composite material and subjected to a heat treatment to form a section of a large aircraft fuselage. Component 300 is illustrated herein in the form of a mandrel assembly for illustrative purposes only. It will be understood that component 300 can be any type of component as desired. For example, component 300 can be a wing of aircraft 102 (shown in FIG. 1) or other part of aircraft 102. Further, component 300 need not be related to an aircraft, and can be a part of any vehicle or structure. Moreover, component 300 can be an entire vehicle or structure itself.

In the exemplary implementation, mandrel assembly 300 is relatively larger than known similar mandrel assemblies. More specifically, mandrel assembly 300 has a length L greater than twenty-four feet. Alternatively, mandrel assembly 300 may have any length L that facilitates operation of locating system 200 as described herein. Further, mandrel assembly includes a first end 302, a second end 304, and a body 306 extending therebetween that includes an outer surface 308. In the exemplary implementation, mandrel assembly 300 is fabricated from a composite laminate material. Alternatively, mandrel assembly 300 may be fabricated from any material as desired for a particular application, such as, but not limited to a metal, such as aluminum or titanium or the like.

Locating system 200 includes a plurality of laser projectors 202 including a first projector 204 and a second projector 206. First projector 204 is positioned a predetermined distance 208 from surface 308 of mandrel assembly 300 such that first projector 204 has a defined first field of view 210 that includes first end 302 and a portion of body 306 of mandrel assembly 300. Similarly, second projector 206 is positioned a predetermined distance 212 from surface 308 of mandrel assembly 300 such that second projector 206 has a defined second field of view 214 that includes second end 304 and a portion of body 306 of mandrel assembly 300. Distances 208 and 212 are determined by a desired accuracy rating of locating system 200. That is, the closer projectors 204 and 206 are to surface 308, the more accurate the measurements by locating system 200. However, the closer projectors 204 and 206 are to surface 308, the narrower the field of view of each projector 204 and 206 and the more projectors will be necessary to include the entire length L of mandrel assembly 300 in adjacent fields of view. As such, projectors 204 and 206 are positioned distances 208 and 212, respectively, from surface 308 to maintain a certain desired accuracy rating while including the entire length L of mandrel assembly 300 within fields of view 210 and 214.

In the exemplary implementation, a portion of fields of view 210 and 214 overlap in a middle portion of body 306 to define a common field of view 216 that is shared by both projectors 204 and 206. Although FIG. 3 shows only two projectors, locating system 200 may have any number of projectors that each include a defined field of view that at least partially overlaps a field of view of an adjacent projector to define a common field of view.

Locating system 200 also includes a plurality of end targets 218. In the exemplary implementation, locating system 200 includes a first plurality of end targets 220 coupled at first end 302 of mandrel assembly 300 such that first plurality of end targets 220 are included within first field of view 210. Similarly, locating system 200 includes a second plurality of end targets 222 inserted into holes 310 coupled at second end 304 of mandrel assembly 300 such that second plurality of end targets 222 are included within second field of view 214. In one embodiment, each of end targets 218 is a reflective target inserted into a hole 310 formed in surface 308 of mandrel assembly 300. End reflective targets 218 may be installed into holes 310 utilizing a snap-fit or other installation mechanism or device known in the art. Each of end reflective targets 218 may have reflectors (not shown) which extend substantially radially from surface 308 and are adapted to reflect photogrammetry light beams and to reflect lasers emitted from laser projectors 204 and 206. In another embodiment, end targets 218 are contrast targets, as described in further detail below.

As shown in FIG. 3, locating system 200 further includes a plurality of center targets 224 formed in surface 308 of mandrel assembly 300. Center targets 214 are configured to provide a reference point for projectors 204 and 206 to measure mandrel assembly surface 308, as described in further detail below. In the exemplary implementation, each center target 224 is a contrast target that includes a first color that is in contrast with a color of surface 308. For example, in one implementation, each contrast target 224 is white in color, while surface 308 is black. As such, contrast targets 224 stand out from surface 308 and enable locating system 200 to easily identify them.

In the exemplary implementation, contrast targets 224 are formed in surface 308 substantially within common field of view 216. Accordingly, first projector 204 is positioned a distance 208 from mandrel assembly 300 such that first field of view 210 includes at least one of the first plurality of end targets 220 and at least one of the plurality of contrast targets 224. Similarly, second projector 206 is positioned a distance 212 from mandrel assembly 300 such that second field of view 214 includes at least one of the second plurality of end targets 222 and at least one of the plurality of contrast targets 224. As describe above, pluralities of end targets 220 and 222 may be include reflective targets, contrast targets, or any combination thereof.

In cases where the mandrel assembly being measured is larger than mandrel assembly 300 or the accuracy rating is desired to be higher than in the locating system shown in FIG. 3, locating system 200 includes additional pluralities of contrast targets 224 and more than two projectors 202. In such a system, the field of view of each projector 202 includes one of a plurality of end targets 220 or 222 and a plurality of contrast targets 224 or two pluralities of contrast targets 224.

In operation, projectors 204 and 206 are utilized to locate and measure contrast targets 224 and accurately project a light pattern (not shown) onto outer surface 308 of mandrel assembly 300 that is aligned with targets 224. Location data is collected by emitting one or more laser beams (not shown) from projectors 204 and 206 towards outer surface 308 of mandrel assembly 300. The laser beams may be reflected off targets 220, 222, and 224 back towards projectors 204 and 206, which may measure target 220, 222, and 224 locations in X, Y, and/or Z planes based on the properties of the returned laser beam, galvanometer rotations, detection hardware, and computational algorithms. Each projector 204 and 206 is required to "see" a predetermined number of targets 220 and 224 or targets 222 and 224 to accurately measure mandrel assembly 300 and perform a proper alignment. The more targets 220, 222, and 224 each projector is able to locate, or "see", the more confident the accuracy of the collected measurements and alignment.

Once the return laser beams are collected by projectors 204 and 206, projectors 204 and 206 transmit data representative of the returned laser beams and galvanometer positions to a computer system 226 for analysis. In the exemplary implementation, computer system 226 is communicatively coupled to each projector, such as projectors 204 and 206, of the plurality of projectors 202 and is a component of locating system 200. Alternatively, computer system 226 is communicatively coupled to each projector 202, but is not a component of locating system 200.

In one implementation, locating system 200 includes a photogrammetry system (not shown) to value the locations of targets 220, 222, and 224 and uses targets 220, 222, and 224 as an aid to measure mandrel assembly 300. The photogrammetry system may be used as an aid to the laser projection system having projectors 202. Alternatively, the photogrammetry system may be used independently of laser projectors 202. Furthermore, combining two inspection technologies, laser projection and photogrammetry, to measure mandrel assembly 300 and to locate features of surface 308 may provide more accurate measurement and location data in a more time and cost efficient manner.

Figure 4:
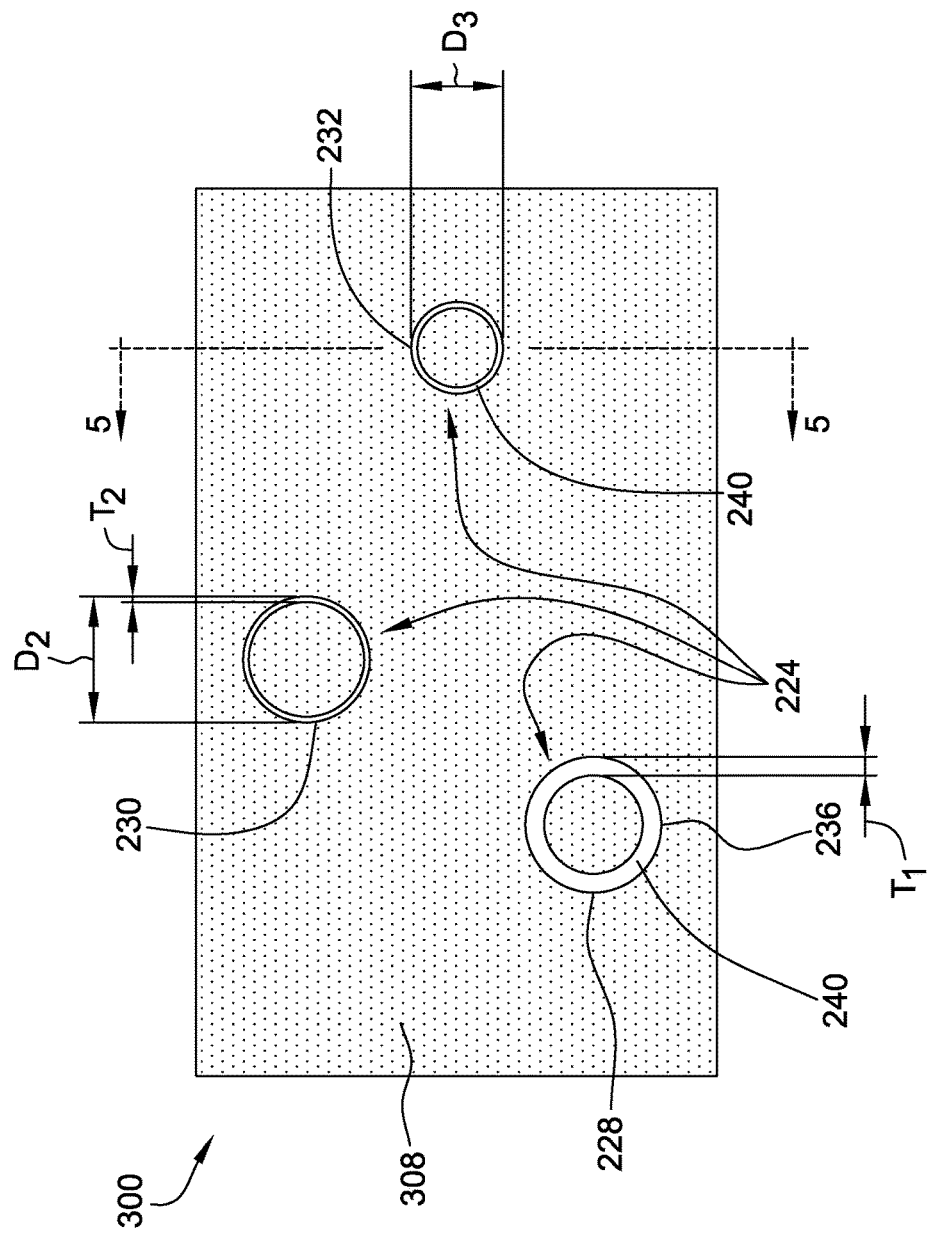
FIG. 4 is an enlarged view of a portion of the component, shown in FIG. 3, having a plurality of contrast targets formed therein.
Figure 5:
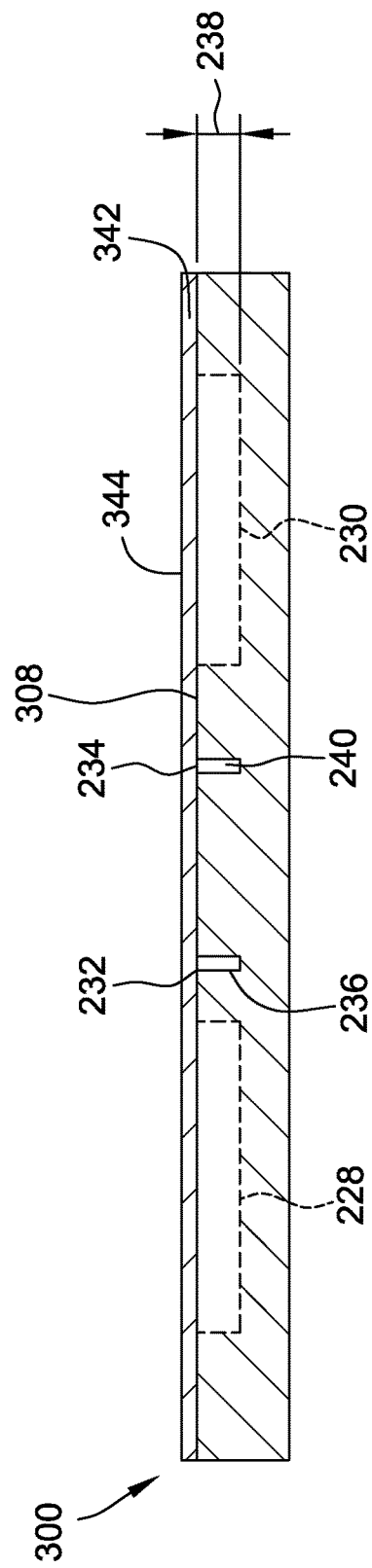
FIG. 5 is a cross sectional view of the portion of the component shown in FIG. 4.

FIG. 4 is an enlarged view of a portion of mandrel assembly 300, and FIG. 5 is a cross sectional view of the portion of mandrel assembly 300 shown in FIG. 4. FIG. 4 shows a portion of the plurality of contrast targets 224 including a first target 228, a second target 230, and a third target 232. In the exemplary implementation, each contrast target 224 is substantially ring-shaped and is embedded into outer surface 308 of mandrel assembly 300 such that an outer surface 234 of each contrast target 224 is substantially flush with outer surface 308. Alternatively, each contrast target 224 is any shape able to be repeatedly and accurately detected by locating system 300 and able to withstand repeated thermal cycles.

As shown in FIG. 4, first contrast target 228 includes a first thickness T1 that is larger than a second thickness T2 of second contrast target 230, wherein thickness is measurement of the difference between an inner diameter and an outer diameter of each target 228, 230, and 232. This is shown to demonstrate that, although each contrast target 224 may have the same thickness, contrast targets 224 may also have different thicknesses. For example, the predetermined thickness of contrast targets 224 may be based on the material from which targets 224 are formed, the material from which mandrel assembly 300 is formed, and the specific setup of locating system 200. Similarly, second contrast target 230 includes a second diameter D2 that is larger than a third diameter D3 of third contrast target 232. This is shown to demonstrate that, although each contrast target 224 may have the same diameter, contrast targets 224 may also have different diameters. For example, the predetermined thickness of contrast targets may be based on the material from which targets 224 are formed, the material from which mandrel assembly 300 is formed, and the specific setup of locating system 200. Generally the diameters of contrast targets 224 are within a range of between approximately 5 millimeters (mm) (0.196 inches (in.)) to approximately 20 mm (0.787 in.). However, contrast targets 224 may have any diameter than facilitates operation of locating system 200 as described herein.

In the exemplary implementation, contrast targets 224 are formed by boring a ring-shaped cavity 236 into surface 308 for each contrast target 224 within common field of view 216. Although FIG. 5 shows that each cavity 236 is bored to the same predetermined depth 238, each cavity 236 may have a different depth 238. Generally, the depth 238 of each cavity 236 is based on the thickness of the contrast target 224, the type of material from which contrast target 224 is formed, and the type of and thickness of the material from which mandrel assembly 300 is formed. More specifically, the depth 238 of cavity 236 is based on the coefficient of thermal expansion (CTE) difference between the type of material from which contrast target 224 is formed and the type material from which mandrel assembly 300 is formed.

Once cavities 236 are bored into surface 308, a contrast color substrate 240 is introduced to fill each cavity 236. In the exemplary implementation, substrate 240 is chosen from the group consisting of a ceramic material, an epoxy, and a resin. More specifically, substrate 240 is a material that is able to withstand the stresses of multiple cycles of heat and pressure followed by cooling. Furthermore, the material of substrate 240 includes a CTE that is similar to a CTE of the material from which mandrel assembly 300 is formed such that substrate 240 expands and contracts at a similar rate at a similar temperature as mandrel assembly 300. As described above, the color of substrate 240 is a contrasting color from the color of mandrel assembly 300 to enable operation of locating system 200. In the exemplary implementation, substrate 240 is substantially white in color when introduced into cavity 236 before curing and mandrel assembly 300 is substantially black in color. Alternatively, substrate 240 and mandrel assembly 300 may be any color as long as they are contrasting colors that are easily discernible by locating system 200.

After each cavity 236 has been filled with substrate 240, mandrel assembly 300 is subjected to a curing process that hardens substrate 240 and forms contrast targets 224. Mandrel assembly 300 is cured at a predetermined temperature for a predetermine time period that is based on substrate 240 material and mandrel assembly 300 material. For example, in embodiments where mandrel assembly 300 is a composite laminate, or any material with a glass transition temperature (Tg) greater than that of substrate 240 cure temperature, and substrate 240 is an inorganic ceramic, mandrel assembly 300 may be cured at a temperature in a range of between approximately 200° F. (93° C.) to approximately 350° F. (150° F.). However, in embodiments where substrate 240 is an epoxy, mandrel assembly 300 may cure at approximately room temperature (22° C. (72° F.)). Substrate 240 material may be any material whose curing cycle requirements do not exceed the Tg of the mandrel assembly 300 material. Curing mandrel assembly 300 ensures that outer surface 234 of each contrast target 224 is substantially flush with outer surface 308 once mandrel assembly 300 is fully cured. In cases surfaces 234 and 308 are not substantially flush after curing, a layer of sealant 342 may be applied to surfaces 234 and 308 to provide mandrel assembly 308 with a uniform outer surface 344. Furthermore, cavities 236 can also be slightly overfilled with substrate 240 to account for shrinking of substrate 240 during cure. In which case, substrate 240 may be sanded flush with outer surface 308 of mandrel assembly 300 post curing.

In embodiments where end targets 220 and 222 (shown in FIG. 3) are also contrast targets, as opposed to reflective targets, the method of operation and manufacture of end targets 220 and 220 is substantially similar to that as describe above with respect to center contrast targets 224. Alternatively, in embodiments where end targets 220 and 222 (shown in FIG. 3) are also contrast targets, as opposed to reflective targets, end targets 220 and 220 may be bushing mount contrast targets.

The method of forming a contrast target for use in a locating system as described herein allows for locating and measuring features of large scale structures to aid in projecting patterns onto the structure that align with the features while maintaining a predetermined accuracy rating. More specifically, the locating system described herein describes two system that may be aided by the use of contrast targets. The first is a laser projection system including a plurality of laser projectors where the projectors are located to the surface using the contrast targets and project light patterns back onto the structure surface that are aligned with the contrast targets. The second is a photogrammetry system where the contrast targets are used to locate the photogrammetry system to the structure surface and the system then measures the surface. The contrast targets are unobtrusive in the manufacturing process and eliminate the need for fixturing, such as a track system, to hold central locating targets to enable locating and measuring of large structures. Furthermore, the contrast targets eliminate the need for placing stick-on, or temporary, contrast targets to enable locating to, and the measuring of or projecting on large scale structures. As such, the risk of introducing foreign object debris of the mandrel surface is substantially reduced. The contrast rings provide a repeatable and accurate method for locating the projector into a CAD space of the mandrel and enables valuing the locations of the contrast rings relative to the mandrel. Furthermore, the methods and system described herein allow for the continued use of laser projectors as an inspection tool for composite layups. Accordingly, the methods and system described herein require minimal time and cost integration.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of forming a mandrel assembly for use in fabricating a large scale component, said method comprising:

boring a plurality of cavities into an outer surface of the mandrel assembly;

filling the plurality of cavities with a contrast color substrate to form a contrast target on the mandrel assembly; and curing the contrast color substrate such that an outer surface of the contrast color substrate is substantially flush with the outer surface of the mandrel assembly when the substrate is fully cured.

2. The method in accordance with claim 1, wherein boring a plurality of cavities comprises boring a plurality of ring-shaped cavities into the outer surface of the mandrel assembly.

3. The method in accordance with claim 1, wherein boring a plurality of cavities comprises boring a plurality of cavities to a predetermined depth in the mandrel assembly based on the contrast color substrate material.

4. The method in accordance with claim 1, wherein boring a plurality of cavities comprises boring a plurality of ring-shaped cavities into the outer surface of the mandrel assembly, wherein each ring-shaped cavity includes a predetermined thickness based on at least one of the contrast color substrate material, and the mandrel assembly material.

5. The method in accordance with claim 1, wherein the locating system includes a plurality of laser projectors each having a respective field of view that at least partially overlaps a field of view of an adjacent laser projector to define a common field of view, wherein boring a plurality of cavities comprises boring a plurality of cavities into the outer surface of the mandrel assembly within the common field of view.

6. The method in accordance with claim 1, wherein filing the plurality of cavities with a contrast color substrate comprises filing the plurality of cavities with a substrate having a color that differs from a color of the mandrel assembly.

7. The method in accordance with claim 1, wherein filing the plurality of cavities with a contrast color substrate comprises filing the plurality of cavities with a contrast color substrate of at least one of a ceramic, an epoxy, and a resin.

8. The method in accordance with claim 1 further comprising applying a sealant layer over the outer surfaces of the mandrel assembly and the color contrast substrate.

9. A method to facilitate measuring a feature of a component, said method comprising:

coupling a first plurality of end targets to a first end of the component;

coupling a second plurality of end targets to a second end of the component;

forming a plurality of center color contrast targets in a surface of the component between the first and second ends, wherein each center color contrast target of said plurality of center color contrast targets is embedded in the component surface such that an outer surface of each center contrast target is substantially flush with the component surface;

positioning a first projector a predetermined distance from the component, wherein the first projector has a defined first field of view that includes at least one of the first plurality of end targets and at least one of the plurality of center color contrast targets; and positioning a second projector a predetermined distance from the component, wherein the second projector has a defined second field of view that includes at least one of the second plurality of targets and at least one of the plurality of center color contrast targets; and measuring a location of the first plurality of end targets, the second plurality of end targets, and the plurality of center color contrast targets on the component surface using the first projector and the second projector.

10. A method in accordance with claim 9, wherein positioning the first and second projectors comprises positioning the first and second projectors such that the first field of view at least partially overlaps the second field of view to define a common field of view.

11. A method in accordance with claim 10, wherein forming the plurality of center color contrast targets includes forming the plurality of center color contrast targets within the common field of view.

12. A method in accordance with claim 9, wherein coupling a first plurality of end targets to a first end and coupling a second plurality of end targets to a second end further comprises coupling a first plurality of at least one of reflective and color contrast targets to the first end and coupling a second plurality of at least one of reflective and color contrast targets to the second end.

13. A method in accordance with claim 9, wherein forming a plurality of center color contrast targets comprises:
   boring a plurality of cavities into the surface of the component;
   filing the plurality of cavities with a contrast color substrate; and
   curing the contrast color substrate such that an outer surface of the contrast color substrate is substantially flush with an outer surface of the component.

14. The method in accordance with claim 13, wherein filing the plurality of cavities with a contrast color substrate comprises filing the plurality of cavities with a substrate having a color that differs from a color of the mandrel assembly.

15. A method in accordance with claim 13, boring a plurality of cavities comprises boring a plurality of ring-shaped cavities into the outer surface of the component.

16. A system to facilitate measuring a feature of a component, said system comprising:
   a plurality of laser projectors, wherein each laser projector has a defined respective field of view that at least partially overlaps a field of view of an adjacent laser projector, wherein the overlapping portions define a common field of view;
   a plurality of end targets coupled to opposing ends of the component; and
   at least one plurality of center color contrast targets formed in a surface of the component between said opposing ends, wherein each common field of view includes a plurality of contrast targets, and wherein each of said at least one plurality of center color contrast targets is embedded in said component surface such that an outer surface of each said contrast target is substantially flush with said component surface.

17. The system in accordance with claim 16, wherein each field of view includes one of a plurality of end targets and a plurality of center color contrast targets or two pluralities of center color contrast targets.

18. The system in accordance with claim 16, wherein said plurality of end targets comprises a plurality of reflective targets, a plurality color contrast targets, or any combination thereof.

19. The system in accordance with claim 16, wherein each of said at least one plurality of contrast targets is ring-shaped and formed from a substrate comprising at least one of a ceramic, an epoxy, and a resin.

20. A system to facilitate measuring a feature of a component, said system comprising:
   a plurality of laser projectors, wherein each laser projector has a defined respective field of view that at least partially overlaps a field of view of an adjacent laser projector, wherein the overlapping portions define a common field of view;
   a plurality of end targets coupled to opposing ends of the component; and
   at least one plurality of center color contrast targets formed in a surface of the component between said opposing ends, wherein each common field of view includes a plurality of contrast targets, and wherein each of said at least one plurality of contrast targets is ring-shaped and formed from a substrate comprising at least one of a ceramic, an epoxy, and a resin.

* * * * *